US011955882B2

(12) United States Patent
Gullvén et al.

(10) Patent No.: US 11,955,882 B2
(45) Date of Patent: Apr. 9, 2024

(54) SAFE ACTIVE DISCHARGE CIRCUIT FOR INVERTER IN VEHICLE

(71) Applicant: AROS ELECTRONICS AB, Mölndal (SE)

(72) Inventors: Henrik Gullvén, Mölndal (SE); Rolf Andersson, Mölndal (SE); Thorbjörn Simonsson, Mölndal (SE)

(73) Assignee: AROS ELECTRONICS AB, Molndal (SE)

( * ) Notice: Subject to any disclaimer, the term of this patent is extended or adjusted under 35 U.S.C. 154(b) by 34 days.

(21) Appl. No.: 17/774,636

(22) PCT Filed: Nov. 6, 2020

(86) PCT No.: PCT/EP2020/081367
§ 371 (c)(1),
(2) Date: May 5, 2022

(87) PCT Pub. No.: WO2021/089831
PCT Pub. Date: May 14, 2021

(65) Prior Publication Data
US 2022/0393571 A1    Dec. 8, 2022

(30) Foreign Application Priority Data

Nov. 8, 2019    (EP) ..................... 19207879

(51) Int. Cl.
*H02M 1/32*    (2007.01)
*B60L 3/00*    (2019.01)
(Continued)

(52) U.S. Cl.
CPC ............. *H02M 1/322* (2021.05); *B60L 3/003* (2013.01); *B60L 15/007* (2013.01); *B60L 50/60* (2019.02);
(Continued)

(58) Field of Classification Search
CPC ......... H02M 1/322; H02M 1/32; B60L 3/003; B60L 15/007; B60L 50/60;
(Continued)

(56) References Cited

U.S. PATENT DOCUMENTS 3,761,799 A    9/1973    Shuey
2016/0226410 A1    8/2016    Lopez de Arroyabe
(Continued)

FOREIGN PATENT DOCUMENTS

DE    1020172188429 A1    4/2019
EP    3468019 A1    4/2019
(Continued)

OTHER PUBLICATIONS

European Search Report completed by the European Patent Office dated Apr. 30, 2020 and issued in connection with European Patent Application No. 19207879.8.
(Continued)

*Primary Examiner* — Elim Ortiz
(74) *Attorney, Agent, or Firm* — Barnes & Thornburg LLP

(57) ABSTRACT

An active discharge circuit for electric vehicle inverter, the active discharge circuit intended to be connected in parallel with a DC link capacitor connected between positive and negative lines of a DC power link, wherein the circuit comprises a dissipative current source, a switch connected in series with the current source between the DC lines, and a controller connected to the switch and arranged to apply an activation signal in dependence of a control signal, the activation signal placing the switch in a conducting state, wherein the current source is configured to draw a discharge current and dissipate any energy stored in the DC link capacitor when the switch is in the conducting state. As long as the switch is closed by the activation signal, the current (Continued)

source will draw a constant current and dissipate power, and the voltage across the DC link capacitor will decrease linearly.

15 Claims, 2 Drawing Sheets

(51) Int. Cl.
 *B60L 15/00* (2006.01)
 *B60L 50/60* (2019.01)
(52) U.S. Cl.
 CPC ..... *B60L 2210/10* (2013.01); *B60L 2240/529* (2013.01)
(58) Field of Classification Search
 CPC ........... B60L 2210/10; B60L 2240/529; B60L 2210/40; Y02T 10/64; Y02T 10/70
 See application file for complete search history.

(56) References Cited

U.S. PATENT DOCUMENTS

2020/0006965 A1* 1/2020 Edelhäuser ........... H02J 7/0031
2022/0037992 A1* 2/2022 Marxer ................... B60L 3/003

FOREIGN PATENT DOCUMENTS

WO  2018162819 A1  9/2018
WO  WO-2020127481 A1 * 6/2020 ............. B60R 16/06

OTHER PUBLICATIONS

PCT International Search Report and Written Opinion completed by the ISA/EP dated Dec. 15, 2020 and issued in connection with PCT/EP2020/081367.
International Preliminary Report on Patentability (Ch.II) completed Dec. 21, 2021 and issued in connection with PCT/EP2020/081367.

* cited by examiner

SAFE ACTIVE DISCHARGE CIRCUIT FOR INVERTER IN VEHICLE

CROSS-REFERENCE TO RELATED APPLICATIONS

This application is a U.S. national counterpart application of International Application Ser. No. PCT/EP2020/081367, filed Nov. 6, 2020, which claims priority to and the benefit of European Patent Application No. 19 207 879.8, filed Nov. 8, 2019, the contents of each which is incorporated by reference herein in their entireties.

FIELD OF THE INVENTION

The present invention relates to a safe active discharge circuit to be arranged in parallel with a DC link capacitor connected between the positive and negative lines of a DC power link.

Background of the Invention

An inverter in a vehicle (and also in many other applications) receives a high voltage input and provides alternating current to drive e.g. an AC machine. The switches of the inverter need to work at high frequency, and requires a steady and reliable DC input voltage. For this reason, a capacitor (referred to as a DC link capacitor) is typically connected between the positive and negative lines, so as to absorb ripple caused by the switching in the inverter. The DC link capacitor thus ensures a steady and reliable voltage across the inverter.

The high voltage input voltage is received over a DC link, essentially two power lines connected to a DC power supply (e.g. high voltage battery) via mechanical breakers (relays). These breakers enable a quick disconnection of the inverter from the battery, in case of a shutdown, caused e.g. by a key turn-off, a power failure, or a vehicle crash. However, the DC link capacitor will still be charged, and this electrical charge needs to be discharged for safety reasons.

A conventional and straight-forward solution is to hard-wire a passive resistor across the capacitor. The resistance is sufficiently high to prevent excessive power loss during normal operation. As a consequence, the discharge through this resistor will require a relatively long time, typically in the order of minutes. Under normal conditions, such as a key turn-off, this is typically not a problem. However, in some situations, such as a crash, there are safety regulations in place which require a faster discharge process, e.g. around five seconds.

To provide such fast discharge, a much lower discharge resistance with a switch in series may be connected across the capacitor. The switch is connected to disconnect the resistance as long as the switch receives a disable command from a control unit. In case of a failure, the disable command will no longer be present, and the switch will connect the discharge resistor causing a rapid discharge of the capacitor. Such a switch controlled discharge resistor is referred to as an active discharge resistor.

A challenge with such an active discharge resistor is handling situations where there is a continuing charging of the capacitor. For example, if the breakers have failed to open, the battery may still be connected, or, in case the vehicle is moving, an AC machine may generate a back electromotive force which is coupled to the capacitor. Such continuous supply of voltage will cause the active discharge resistor to discharge a continuous supply of energy. Conventional active discharge resistors have therefore been required to have power capacity and heat rating sufficient for continuous operation, leading to significant cost increase.

A solution to this problem is presented by US2017/0355267, where a timing circuit is introduced to further control the switch of the active discharge resistor. According to this solution, the timing circuit will disconnect the discharge resistor after a predetermined time period, if there is still voltage across the capacitor. This solution is, however, relatively complex and expensive. Another example is provided by EP 3 468 019.

There is a need for an improved active discharge circuit, which avoids the above drawbacks.

General Disclosure of the Invention

According to a first aspect of the present invention, this and other objects are achieved by an active discharge circuit for electric vehicle inverter, the active discharge circuit intended to be connected in parallel with a DC link capacitor connected between positive and negative lines of a DC power link, and configured to discharge said DC link capacitor in less than seven seconds, wherein the circuit comprises a dissipative current source, a switch connected in series with the current source between the DC lines, and a controller connected to the switch and arranged to apply an activation signal in dependence of a control signal from a vehicle control system, the activation signal placing the switch in a conducting state, wherein the current source is configured to draw a discharge current and dissipate any energy stored in the DC link capacitor when the switch is in the conducting state.

With this design, the energy in the capacitor will be dissipated by a current source instead of a passive resistor. As long as the switch is closed by the activation signal, the current source will draw a constant current and dissipate power, and the voltage across the DC link capacitor will decrease linearly.

An active discharge circuit using a dissipative current source according to the present invention will have improved performance at similar power rating, or, put differently, require lower power rating to comply with performance requirements. Performance is here related to discharge of a given high voltage down below a given limit, within a given time.

As an example, a typical prior art active discharge resistor may have a power rating of 24 W, while the active components of the present invention may have a power rating of only 7 W for comparable performance.

In a preferred embodiment, the current source is connected in series with one or several additional active components. Each active component will provide additional dissipation power capability. This has the advantage of an increased thermal mass at low cost (many small components instead of one large).

The active components may be transistors connected in a chain, source-to-drain. The transistors will be operated in the linear (non-saturated) region, i.e. with current through and voltage across each transistor. The transistors may e.g. be Field Effect Transistors (FETs), Insulated Gate Bipolar Transistors (IGBTs), or Bipolar Junction Transistors (BJTs).

The circuit may further comprise a set of resistors connected in series across the DC link capacitor so as to divide a voltage across the DC link capacitor into a set of intermediate voltages, each intermediate voltage connected to a gate of one of the (field effect) transistors. As a consequence, each transistor will be conducting as long as there is voltage across the DC link capacitor.

In one embodiment, the dissipative current source comprises a transistor and a voltage regulator connected between a gate of the field effect transistor and the negative DC line. As long as a biasing current flows through the voltage regulator, a constant voltage will be applied to the gate of the transistor. When the switch is placed in a conducting state, this will result in a constant current (discharge current) flowing through the transistor.

Also here, the transistor may be e.g. a field effect transistor (FET), an Insulated Gate Bipolar Transistor (IGBT), or a Bipolar Junction Transistor (BJT). The voltage regulator may be implemented by a Zener diode, a transient-voltage-suppression diode or a voltage reference IC.

Preferably, the drain of the transistor is connected to the positive line without any intermediate resistive load. This means that the discharge current does not cause any resistive dissipation, i.e. all dissipation is provided by active circuits (i.e. the current source and any additional active components).

In some embodiments, a predefined "idle" current is allowed to flow through the dissipative elements (transistors) also when the switch is in a non-conducting state. Such an idle current is significantly smaller than the discharge current. For example, the current may be less than 1 mA, e.g. less than 0.5 mA or less than 0.1 mA, while the discharge current may be in the order of 5-50 mA. Such an idle current may be used to power the controller, thus providing a secure independent power supply whenever the link capacitor is charged.

In one embodiment, the switch comprises a field effect transistor having a drain connected to the set of active components, a source connected to ground (via a resistor), and a gate connected to receive the activation signal.

The controller may be configured to apply a steady activation signal, to thereby control the current source to draw a constant discharge current, such that a voltage across the DC link capacitor is linearly declining. Alternatively, the controller is configured to apply an intermittent activation signal, thus allowing a non-constant discharge current. For example, the current source may be controlled to draw an increasing current so as to dissipate a constant power, such that the energy discharge of the DC link capacitor is linear. Or, the current source may be controlled to draw a decreasing current, such that the voltage across the DC link capacitor is exponentially declining. This effectively corresponds to the performance of a passive discharge resistor, which may be advantageous in situations where the discharge should be synchronized with other discharge processes.

The control signal may be communicated on a bidirectional serial communication bus. Such a serial communication bus is typically already present in the vehicle, and provides a simple way to access the controller. In order to ensure the desired safety, the communication may be provided on a "black channel", e.g. involving a specific (secure) communication protocol.

Alternatively, the control signal is a (one way) discharge request signal, and the controller is configured to apply the activation signal when the discharge request signal is absent. Such a signal is always present during normal operation of the vehicle, but in case of a malfunction, the discharge request signal is no longer provided and the active discharge should be activated.

In one embodiment, the active discharge circuit comprises circuitry for pulsing the discharge request signal to generate a pulsed discharge signal, and the controller is configured to verify the pulsed discharge signal and to supply the activation signal when the verification is unsuccessful. For example, the controller may be configured to verify pulse width, pattern and/or pulse repetition frequency of the pulsed discharge signal. This is done to assure integrity of the signal and detect latent faults in the input circuit.

It is noted that such pulsing of a control signal, in order to make it more reliable, may be considered to represent a further inventive concept, which may be beneficial also in other contexts than an active discharge circuit according to the first aspect of the invention discussed above. Indeed, in any situation where the absence of a control signal is used to system failure, a modulation (pulsing or other modulation) of that control signal using a power supply inherent to the system will make it possible to verify the complete signal path for the control signal, i.e. all components between the control signal input terminal to the controller. For example, an interface between high and low voltage domains, such as an optocoupler, may malfunction to produce a constant "high" level. By pulsing the control signal, such a malfunction is immediately detected. Further, in a situation where the control signal remains "high" even during a system failure, the system failure will typically also lead power loss of the low voltage circuitry, and thus to interruption of the modulation. The system failure will thus still be detected. The switch may be connected to the negative line via a resistor, and the controller may be connected to detect a voltage over this resistor. The detected voltage is indicative of the current through the resistor, and may be used for a simple functionality test. To assure availability of the function, a short (order of ms) activation signal can be applied while measuring the resulting current. The controller may thus verify correct operation of the active discharge circuit.

According to one embodiment, the active discharge circuit may further comprise a voltage meter connected to detect a link voltage between the DC lines (i.e. across the link capacitor), and the controller may then be connected to receive an indication of this link voltage from the voltage meter and determine if the link voltage is declining correctly, and, when it is determined that the link voltage does not decline correctly, bring the switch to a non-conducting state.

This allows the controller to immediately disable the active discharge process, in the event of a fault condition preventing the voltage to fall as intended. For example, this may be the case if the DC power supply for some reason has not been properly disconnected from the inverter. By deactivating the active discharge, thermal events (overheating etc.) in the discharge circuit can be avoided. An active discharge circuit according to this embodiment of the invention may comply with relevant security regulations for electrical vehicles, e.g. ISO 26262 and IEC 13849.

BRIEF DESCRIPTION OF THE DRAWINGS

The present invention will be described in more detail with reference to the appended drawings, showing currently preferred embodiments of the invention.

DETAILED DESCRIPTION OF CURRENTLY PREFERRED EMBODIMENTS

Figure 1:
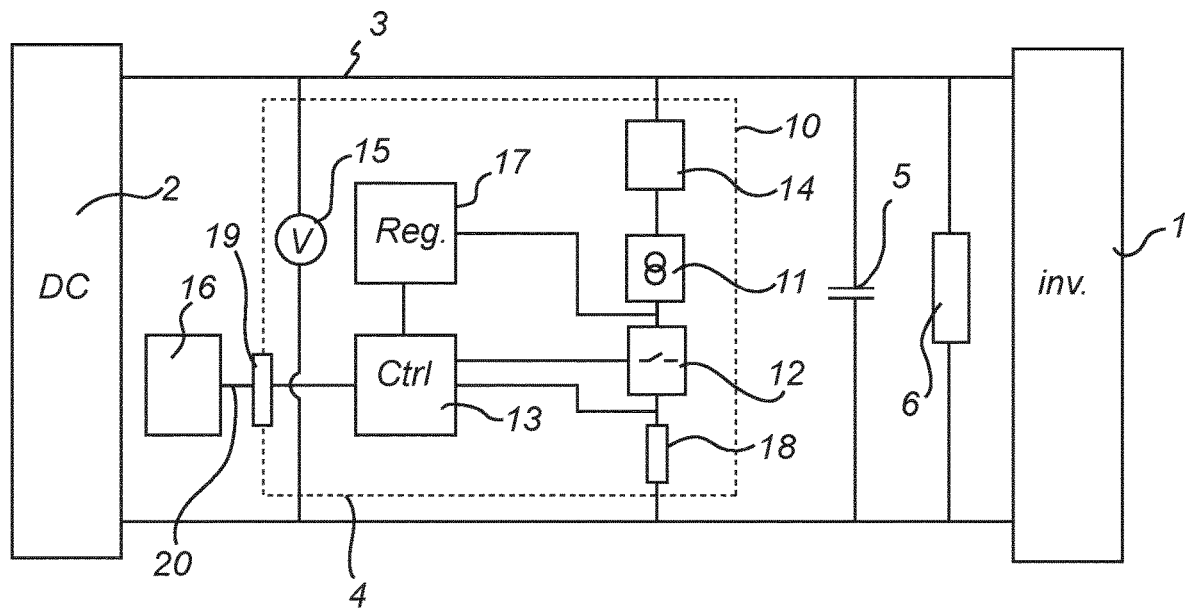
FIG. 1 is a schematic block diagram of an active discharge circuit according to an embodiment of the invention, connected across the DC link capacitor of an electric vehicle inverter.

FIG. 1 shows an inverter circuit 1 connected to a DC power supply 2 by means of a DC link comprising a positive line 3 and a negative line 4. A DC link capacitor 5 is connected in parallel with the inverter 1, and a high resistance passive discharge resistor 6 is connected in parallel with the link capacitor to ensure discharge of the capacitor in case of inverter failure or power loss.

The inverter is here connected to provide AC voltage for an electrical machine in an electrical vehicle. The motor may form part of the traction system of the vehicle, but may alternatively be a motor for some other appliance, such as power regeneration, an air compressor, a water pump, etc. As an example, the voltage across the lines 3, 4 of the DC link is 800 V. An active discharge circuit 10, according to an embodiment of the invention, is also connected in parallel with the link capacitor 5. The active discharge circuit 10 here includes a current source 11 connected in series with a switch 12 across the link capacitor 5. A controller 13 is connected to control the switch 12. Further, in the illustrated embodiment, an additional dissipative element 14 is connected in series with the current source 11.

The active discharge circuit 10 may further include a voltage meter 15, connected to measure the voltage across the DC link, and provide a signal indicative of this voltage to the controller 13.

The controller 13 is connected to receive a control signal 20 from a vehicle controller 16 via a suitable interface 19. The interface 19 may, for example, provide isolation between a high voltage domain and a low voltage domain of the system. For this purpose, the interface 19 may include an optocoupler.

The control signal 20 may be communicated on a bidirectional serial communication link, such as a CAN bus. Such serial communication is then preferably configured as a safety critical "black channel", e.g. provided with a communication protocol that enables detection of any fault condition.

Alternatively, the control signal 20 is a one way communication of a (binary) discharge signal. In this case, it may be useful to provide the interface 19 with circuitry for increasing the reliability of such a simple control signal. This will be discussed in some detail below, with reference to FIG. 3.

In use, the controller 13 will receive a control signal 20 from a vehicle controller 16, and in response to this signal provide an activation signal to the switch 12, thereby bringing the switch to a closed (conducting) state. In a typical case, the discharge signal is normally present (high) except when there is a fault condition or breakdown, in which case it is absent (low). The controller 13 thus provides an activation signal to the switch 12 in absence of the discharge signal.

When the switch 12 is closed, a constant and predefined current will be drawn by the current source 11, and energy will be dissipated in the current source 11 as well as in any additional dissipative element 14.

Figure 2:
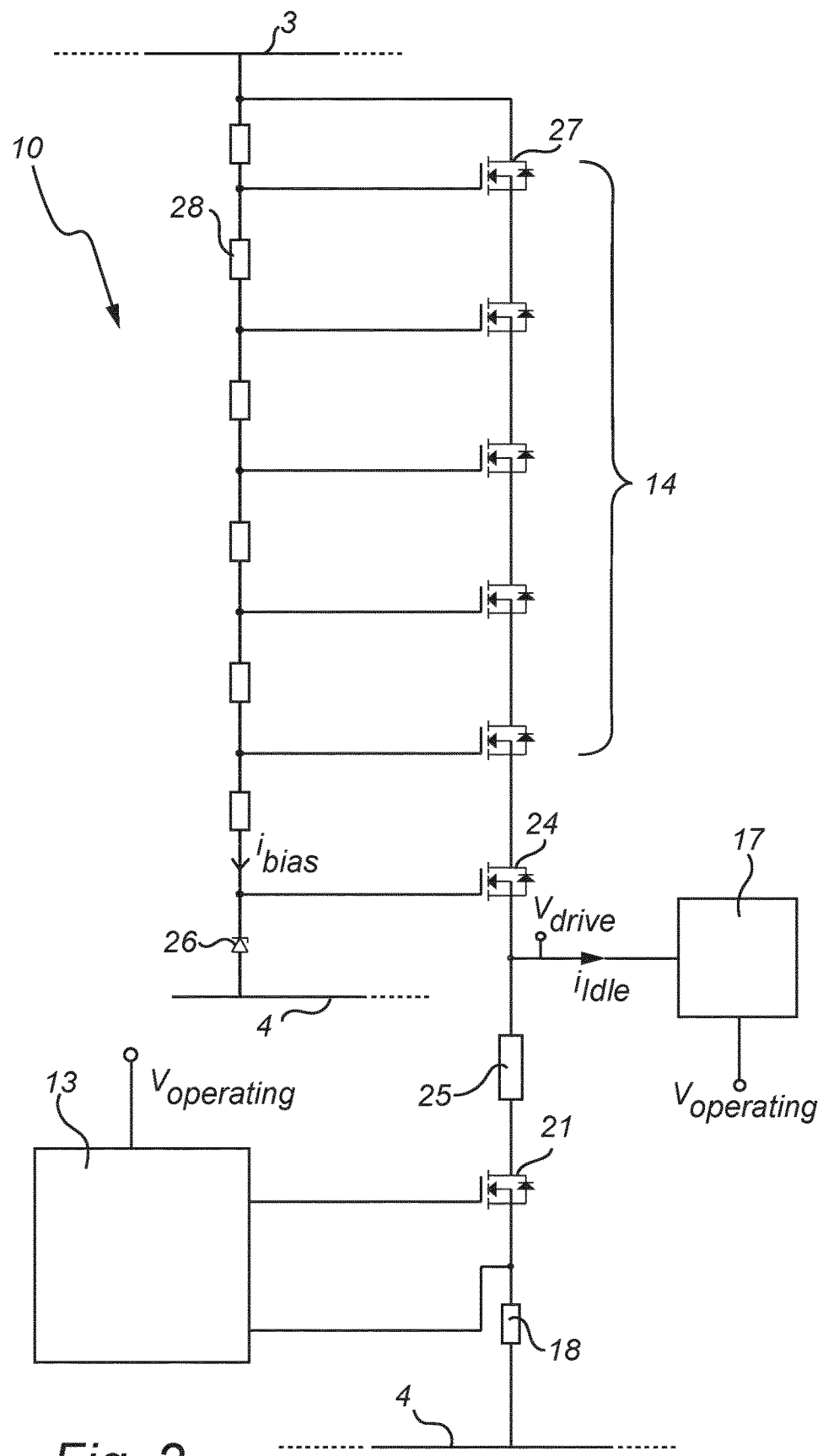
FIG. 2 is a more detailed circuit diagram of an embodiment of the active discharge circuit in FIG. 1.

FIG. 2 shows a more detailed embodiment of the active discharge circuit in FIG. 1. In this case, the switch 12 is realized by a field effect transistor 21 connected with its source to the negative DC line 4 (via a resistor 18) and its drain to the current source 11. The gate of the transistor 21 is connected to receive the activation signal from the controller 13.

The current source 11 here comprises a field effect transistor 24 connected with its source to the drain of the transistor 21 (via a resistor 25), and its gate connected to the cathode of a Zener diode 26 having an anode connected to the negative power line 4.

The dissipation element 14 is here realized by a set (one or more) of field effect transistors 27, connected source-to-drain between the transistor 24 drain and the positive power line 3. Further, the circuit includes a set of resistors 28, connected in series between the positive line 3 and the diode 26 cathode. Each resistor 28 is connected between gates of adjacent transistors 27, so as to form a string of interconnected resistors 28 and transistors 27.

In use, the voltage across the DC link will be divided by the resistors 28 into a set of intermediate voltages, one across each resistor 28. Each transistor gate will be subject to one such intermediate voltage, thereby keeping each transistor 27 in a conducting state.

Further, there will be a small current $i_{bias}$ flowing through the series of resistors 28, and finally trough the Zener diode 26. This current will serve as a biasing current, to maintain a constant voltage (e.g. around 15V) across the Zener diode 26. This constant voltage will be applied to the gate of the transistor 24, thereby defining a specific operating state of the transistor 24. The biasing current will gradually decrease as the charge of the link capacitor 5 is discharged. However, the voltage across Zener diode 26 will remain substantially constant as long as the voltage across the capacitor 5 is sufficiently large. As an example, if there are six resistors 28 (like in FIG. 2), each with a resistance of 270 kOhm, the biasing current will be around 0.5 mA for a capacitor voltage of 800V.

When the transistor 21 receives an activation signal from the controller 13, the transistor 21 will be brought to a conducting state, allowing current $i_{discharge}$ to pass from drain to source. The size of this discharge current will be defined by the state of the transistor 24, defined by the voltage across the Zener diode 26 and the resulting voltage across resistor 25.

As the current flows through the set of transistors 27, energy will be dissipated in each transistor 27 (and also in the transistor 24), so as to gradually discharge the capacitor 5. As long as the activation signal is present, the discharge current through the transistors 27, 24 will be constant, and the voltage decline across the capacitor 5 will be linear.

The voltage across the Zener diode 26—and thus the current drawn by the transistor 24—will here remain substantially constant down to a voltage across the capacitor below 60 V, which is the regulatory requirement. In practice, the discharge circuit will continue to be active also below 60 V, but then with a slightly lower discharge current, as the voltage across Zener diode 26 will be smaller when the biasing current is very small. Eventually, the remaining voltage across the link capacitor 5 will be too small to keep the transistors 24, 27 in their conducting state, and the discharge circuit 10 will be disabled.

In an alternative embodiment, the current source 11, 24 is configured to draw a larger discharge current than the dissipation elements 14, 28 can withstand at full capacitor voltage (e.g. 800 V). The controller 13 is then configured to provide an intermittent (pulsed) activation signal, starting at a relatively low duty cycle and then increasing the duty cycle (eventually reaching a permanent ON state). With adequate duty cycle control, the current source 11, 24 can be controlled to draw an increasing average current such that the dissipated power is constant. The energy discharge of the DC link capacitor 5 will then be linear (and the voltage decline exponential).

In yet another embodiment, the controller 13 is again configured to provide an intermittent (pulsed) activation signal, this time with a decreasing duty cycle. With adequate duty cycle control, the current source 11, 24 can be controlled to draw a decreasing average current, such that the voltage across the DC link capacitor is exponentially declining. This behavior resembles that of a conventional discharge resistor, and may be advantageous if the discharge should be aligned with the discharge of other capacitors.

During discharge, the controller 13 may be configured to continuously detect the voltage across the DC link using the voltage meter 15, to verify that the voltage decreases as intended. If it is detected that the voltage does not decrease, this is an indication of a fault condition, for example that the power supply 2 is still connected to the DC link. In this situation, a continued activation of the active discharge circuit 10 may lead to thermal events in the dissipation components 14 (transistors 27) potentially damaging the components or even causing a fire hazard. The controller is therefore preferably configured to deactivate the switch 12 if it determines that the voltage across the DC link is not decreasing as intended.

With further reference to FIGS. 1 and 2, a resistor 18 may be connected between the switch 12 (transistor 21) and the negative line 4. The voltage across the resistor 18 may then be provided to the controller 13, and serve as a current detector. This may be used to implement a simple functionality test. The controller 13 may be configured to provide a short (order of ms) activation signal to the switch 12, and then verify that the detected current is as expected.

In either case mentioned above, i.e. if the voltage does not decrease as intended or if a functionality test fails, the active discharge circuit can be disabled. In this situation, the high resistance discharge resistor 6 will provide a "safe state", ensuring that the link capacitor 5 will be discharged (albeit slower). When the controller 13 communicates with the vehicle controller 16 over a bidirectional communication link (see above) the controller may also communicate to the vehicle controller 16 that the active discharge circuit has been disabled.

By implementing the above described safety functions, the active discharge circuit may be designed to comply with relevant safety regulations, such as ISO 26262 and IEC 13849.

Figure 3:
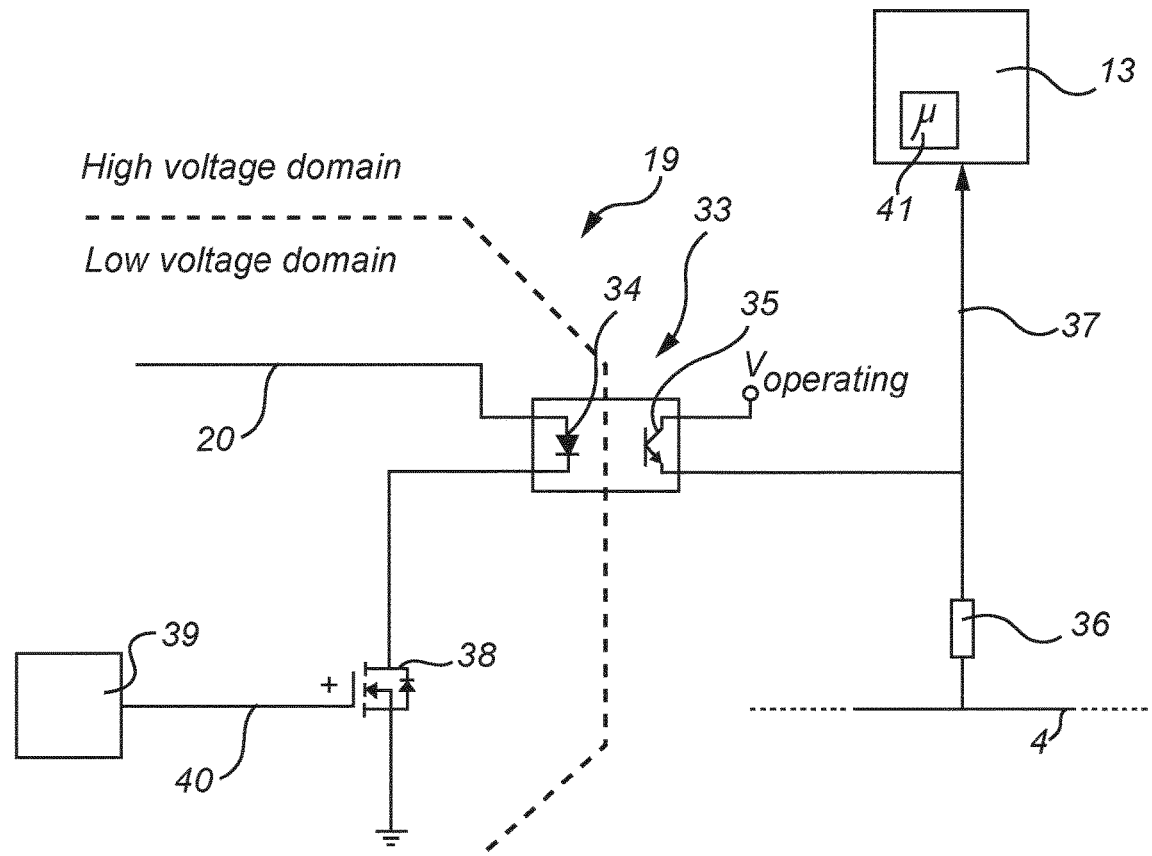
FIG. 3 is a circuit diagram of a discharge signal processing circuitry according to an embodiment of the invention.

FIG. 3 shows an example of an interface 19, in the case where the communication 20 is a discharge signal from the vehicle controller 16. The interface 19 here includes an optical switch 33, including an LED 34 and a phototransistor 35. The photoresistor 35 is connected between the operating voltage and to the negative line 4 via a resistor 36. The anode of the LED 34 is connected to the discharge signal 20, and the cathode of the LED 34 is connected to the drain of a transistor 38. The transistor 38 has a source connected to ground, and a gate connected to a pulse signal 40 from a pulse generator 39.

In use, when the discharge signal 20 and the pulse signal 40 are both active, the phototransistor 35 will provide a pulsed signal output 37. If either the discharge signal 20 or the pulsed signal 40 is absent, there will be no pulsed output 37.

Turning to the controller 13, shown in more detail in FIG. 3, this includes a processing circuitry 41 for verifying that the output from the phototransistor 35 is a pulsed signal. The circuitry 41 may be configured to verify a voltage level, a pulse frequency, a pulse duration, a pulse pattern or a combination of the above. The processing circuitry 41 will provide an activation signal output if and only if the pulsed discharge signal cannot be verified. In other words, if the discharge signal 20 is absent, or if the power to the pulse generator 39 is broken, the controller 13 will activate the switch 12 to discharge the capacitor 5.

Again with reference to FIGS. 1 and 2, in the illustrated embodiment the voltage on the source of transistor 24 is used to drive the controller 13. Specifically, the voltage is here applied to a voltage regulating circuit 17, and the output from the voltage regulator 17 ($V_{operating}$) is used to power the controller 13. In the illustrated example, the voltage across the Zener diode 26 is around 15V, and the voltage between gate and source of transistor 24 ($V_{gs}$) is around 3V, such that the voltage $V_{drive}$ on the source of the transistor 21 is around 12 V. The output from the voltage regulator 17 may be typically 2-5V.

When the voltage is used to power the controller, there will be a small idle current through the transistors 27. This idle current will cause a loss, and should therefore not be greater than necessary. Specifically, it should be significantly smaller than the discharge current. Typically, the idle current will be at least five times, and may be ten times, smaller than the discharge current.

As an example, for a relatively small link capacitor 5, a discharge power of 4 W may be sufficient, which, for a 800 V link voltage corresponds to a discharge current of 5 mA (=4 W/800 V). If the idle current is 1 mA, this will result in losses of 0.8 W (=800 V×1 mA), which is acceptable.

It is noted that the switch 12, which in FIG. 2 is illustrated as a transistor 21, may alternatively be realized by suitable circuitry in the controller 13. For example, the controller 13 may be configured to connect the operating voltage from the voltage regulator to ground via a suitable resistor (not shown).

The person skilled in the art realizes that the present invention by no means is limited to the preferred embodiments described above. On the contrary, many modifications and variations are possible within the scope of the appended claims. For example, other types of transistors may be used instead of the illustrated field effect transistors. Further, given voltage and current levels are only exemplary.

The invention claimed is:
1. An active discharge circuit for electric vehicle inverter, the active discharge circuit intended to be connected in parallel with a DC link capacitor connected between positive and negative lines of a DC power link, and configured to discharge said DC link capacitor in less than seven seconds, wherein the active discharge circuit comprises:
   a dissipative current source,
   a switch connected in series with the current source between the DC lines, and
   a controller connected to the switch and arranged to apply an activation signal in dependence of a control signal from a vehicle control system, said activation signal placing said switch in a conducting state,
   wherein the current source is configured to draw a discharge current and dissipate any energy stored in the DC link capacitor when said switch is in the conducting state, so that, when said switch is in the conducting state, the voltage across the DC link capacitor will decrease linearly
   wherein said dissipative current source comprises a transistor connected with its source to a drain of the switch and with its drain to the positive DC line, and a voltage regulator connected between a gate of the transistor and the negative DC line, and wherein, when said switch is in a non-conducting state, an idle current is allowed to flow through said transistor, said idle current being significantly smaller than said discharge current, which idle current is used to power said controller.

2. The active discharge circuit according to claim 1, further comprising a set of active components connected in series between the positive line and the current source.

3. The active discharge circuit according to claim 2, wherein the active components are transistors connected source-to-drain.

4. The active discharge circuit according to claim 3, further comprising a set of resistors connected in parallel with the DC link capacitor so as to divide a voltage across the DC link capacitor into a set of intermediate voltages, each intermediate voltage connected to a gate of one of said field effect transistors.

5. The active discharge circuit according to claim 1, wherein a drain of the transistor is connected to the positive line without any intermediate resistive load.

6. The active discharge circuit according to claim 5, wherein the idle current is at least five times smaller than the discharge current, and preferably at least ten times smaller than the discharge current.

7. The active discharge circuit according to claim 1, wherein the switch comprises a transistor having a drain connected to said current source, a source connected to the negative DC line, and a gate connected to receive the activation signal.

8. The active discharge circuit according to claim 1, wherein the controller is configured to apply a steady activation signal, to thereby control the current source to draw a constant discharge current, such that a voltage decline across the DC link capacitor is linear.

9. The active discharge circuit according to claim 1, wherein the controller is configured to apply an intermittent activation signal with increasing duty cycle, to thereby control the current source to draw an increasing average current so as to dissipate a constant power, such that a voltage decline across the DC link capacitor is exponentially increasing.

10. The active discharge circuit according to claim 1, wherein the controller is configured to supply an intermittent activation signal with decreasing duty cycle, to thereby control the current source to draw a decreasing average current, such that the voltage across the DC link capacitor is exponentially declining.

11. The active discharge circuit according to claim 1, wherein said control signal is communicated on a bidirectional serial communication bus.

12. The active discharge circuit according to claim 1, wherein said control signal is a discharge request signal, and the controller is configured to apply said activation signal when said discharge request signal is absent.

13. The active discharge circuit according to claim 12, further comprising circuitry for pulsing said discharge request signal to generate a pulsed discharge signal, and wherein said controller is configured to verify said pulsed discharge signal and to supply the activation signal when the verification is unsuccessful.

14. The active discharge circuit according to claim 1, wherein the switch is connected to the negative line via a resistor, and the controller is connected to detect a voltage over said resistor.

15. The active discharge circuit according to claim 1, further comprising:

a voltage meter connected to detect a link voltage between the DC lines, and wherein the controller is connected to receive an indication of said link voltage from the voltage meter and, in response to determining that the link voltage is not declining correctly, bring said switch to a non-conducting state.

* * * * *